Dec. 16, 1930.   C. L. HAWES   1,784,988
MECHANICAL RADIATOR ORNAMENT
Filed May 7, 1930   2 Sheets-Sheet 1
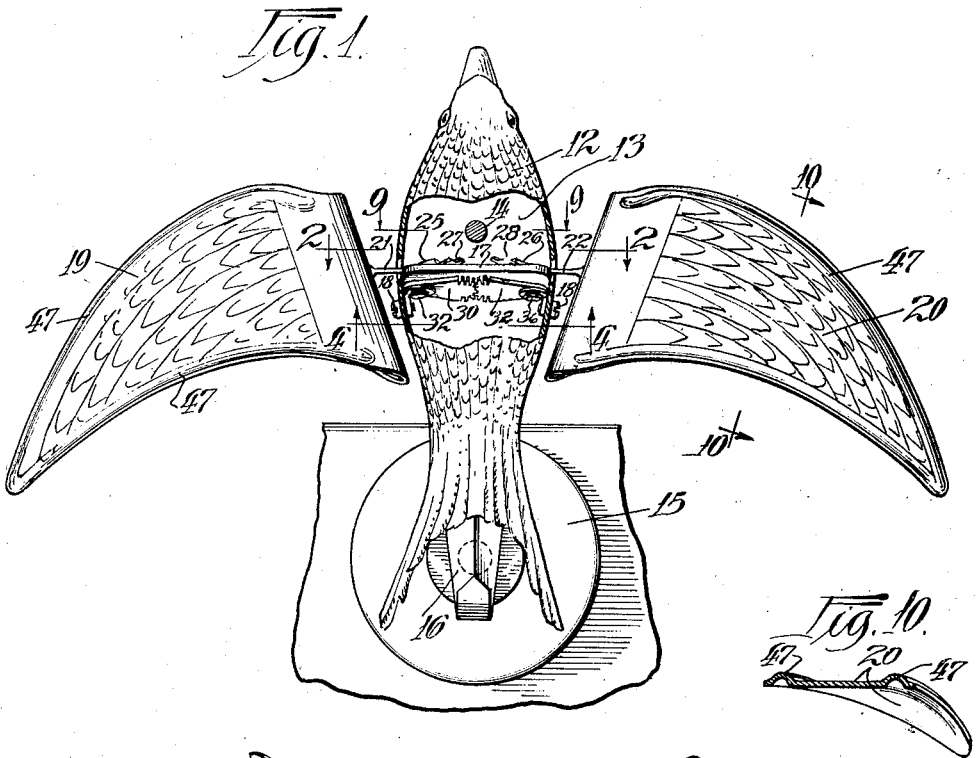
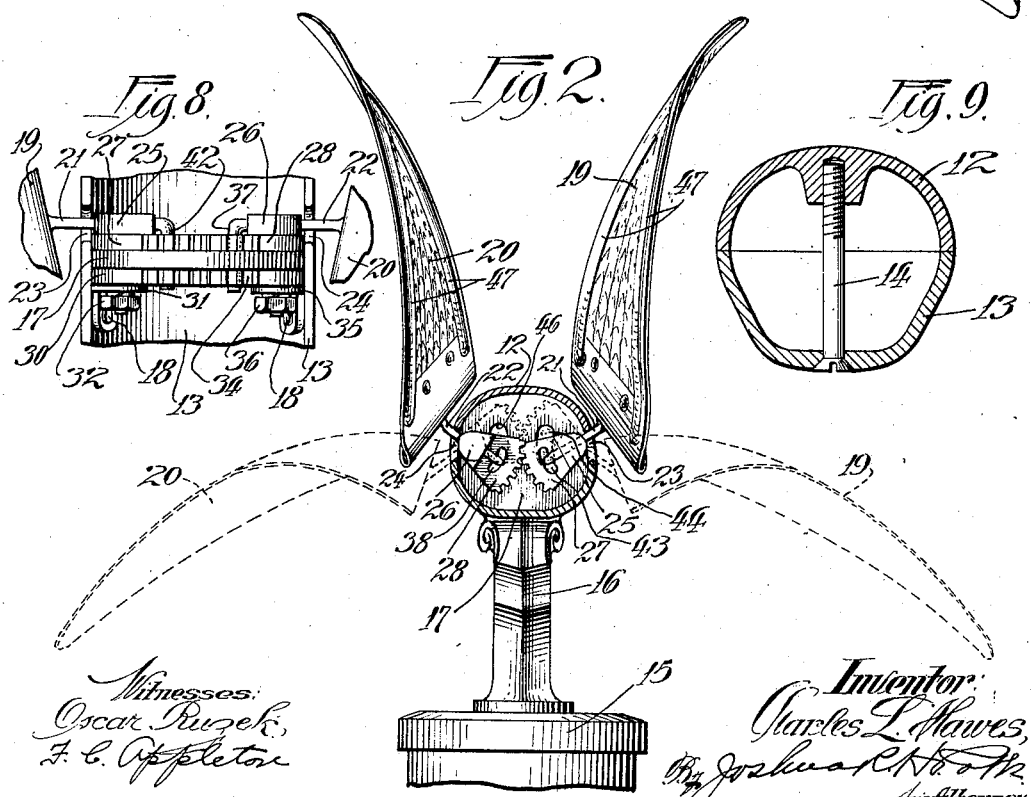

Dec. 16, 1930.  C. L. HAWES  1,784,988
MECHANICAL RADIATOR ORNAMENT
Filed May 7, 1930  2 Sheets-Sheet 2
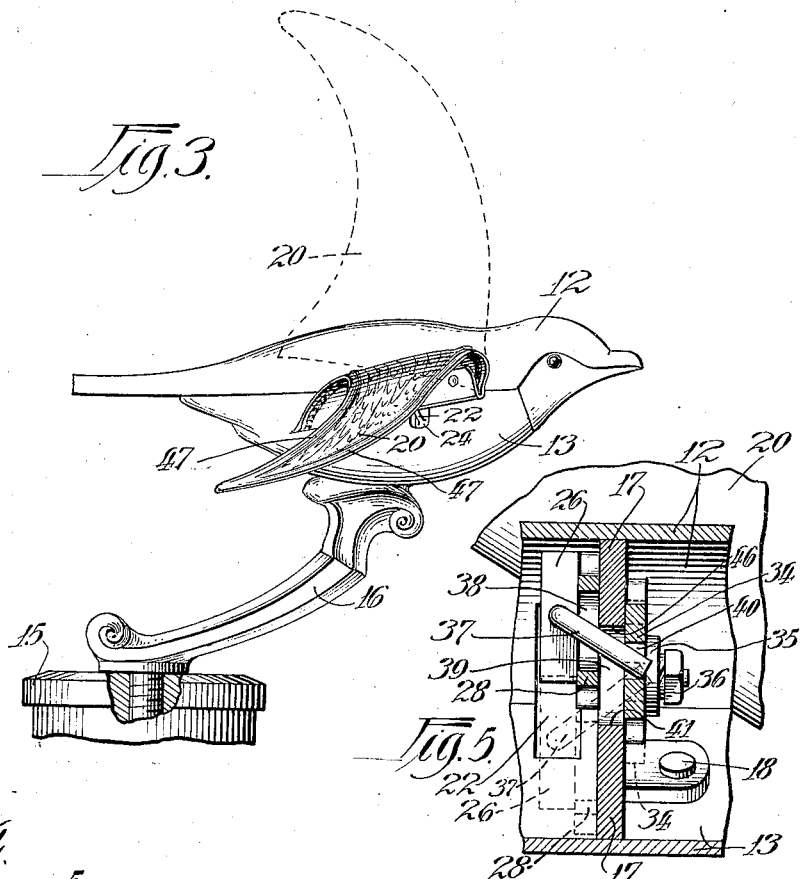
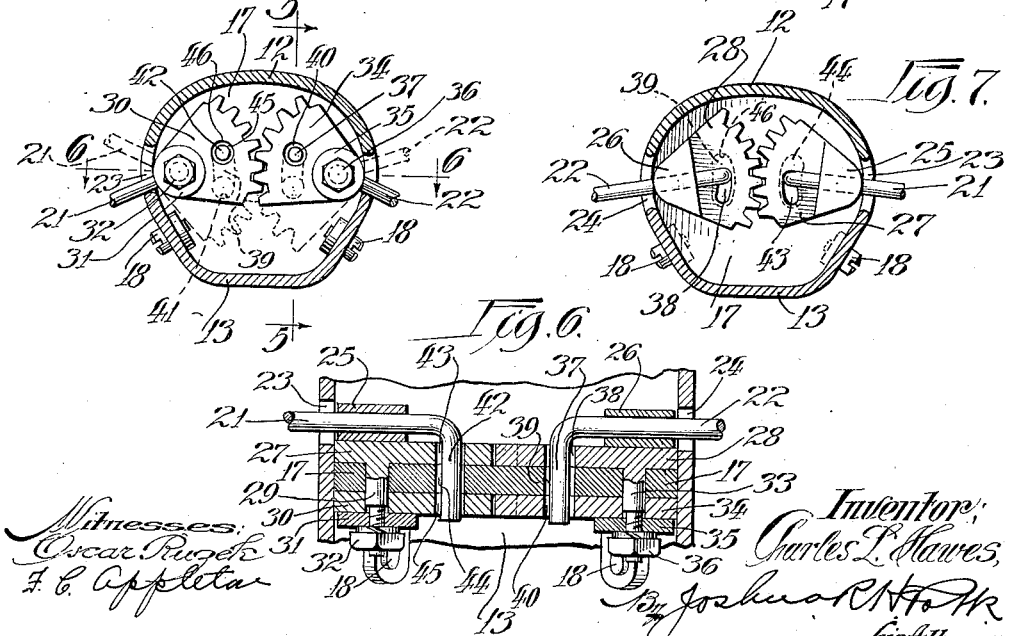

Patented Dec. 16, 1930

1,784,988

UNITED STATES PATENT OFFICE

CHARLES L. HAWES, OF CHICAGO, ILLINOIS, ASSIGNOR OF ONE-HALF TO CHRISTOPHER STRASSHEIM, OF CHICAGO, ILLINOIS

MECHANICAL RADIATOR ORNAMENT

Application filed May 7, 1930. Serial No. 450,398.

This invention relates to a mechanical radiator ornament in which the movable parts are adapted to be operated through the medium of wind or force of air. An object of the invention is the provision of a novel device preferably constructed to simulate a bird in appearance and operation and adapted to be mounted upon the radiator cap of an automobile or other convenient location. The device of the invention is provided with a pair of movable members adapted to operate in unison and arranged to imitate the wings of a bird whereby simulation of a bird in flight is effectually reproduced through internal mechanism of the device by means of wind alone or the force of air created by a moving vehicle in conjunction, to some extent, with the force of gravity in the downward swinging movement of the wings.

Other objects will appear hereinafter.

The invention consists in the combinations and arrangements of parts hereinafter described and claimed.

The invention will be best understood by reference to the accompanying drawings forming a part of this specification, and in which:

Fig. 1 is a plan view of a preferred embodiment of the device in operative position with a portion of the upper section broken away to show the internal mechanism;

Fig. 2 is a vertical sectional view taken substantially on the line 2—2 of Fig. 1;

Fig. 3 is a side elevational view of the device;

Fig. 4 is a vertical sectional view taken substantially on the line 4—4 of Fig. 1;

Fig. 5 is an enlarged sectional view taken substantially on the line 5—5 of Fig. 4;

Fig. 6 is a plan sectional view taken substantially on the line 6—6 of Fig. 4;

Fig. 7 is a sectional view similar to Fig. 2 on a slightly enlarged scale;

Fig. 8 is a plan view of the operating mechanism;

Fig. 9 is a sectional view taken on the line 9—9 of Fig. 1; and

Fig. 10 is a sectional view through one of the wings taken substantially on the line 10—10 of Fig. 1.

As illustrated in the drawings, the preferred embodiment of the device comprises a hollow casing formed in general outline in imitation of a bird and composed of upper section 12 and lower section 13 secured together by bolt 14. The device may be conveniently supported on radiator cap 15 of a motor vehicle by means of bracket 16 secured to section 13. The operating mechanism of the device is preferably mounted upon a mounting plate 17 which may be supported by bolts 18 and is adapted to extend transversely through the interior of the device. Extending laterally from the sides of the device are two wing members 19 and 20, which are secured to links 21 and 22, respectively, which project interiorally of the body casing through side openings 23 and 24, respectively, which are of sufficient size to permit oscillating motion of the wings. Links 21 and 22 are journalled for rotational oscillation in bearing members 25 and 26, respectively, which in turn are pinned or otherwise rigidly secured to segmental gears 27 and 28, respectively. Gear 27 is pivotally mounted relative to the plate 17 by means of a post 29 which is adapted to extend through an opening in plate 17 for oscillatory movement relative thereto. Pivotally mounted upon post 29 on the opposite side of plate 17 from gear 27 is a segmental gear 30, and this portion of the device is secured in operative position by washer 31 engaged by nut 32 threaded on post 29. The construction is such that segmental gear 30 is adapted to swing upon an axis coincident with segmental gear 27, but independently thereof, and these parts coact automatically to properly manipulate the associated wing.

It will be noted that gear 27 meshes with gear 28 whereby they are adapted to operate in unison, and the latter gear 28 is likewise provided with a post 33 which is journalled in plate 17 and upon which is pivotally mounted segmental gear 34 held in place by washer 35 and nut 36. Gear 34 is adapted to coact by meshing engagement with gear 30, similarly to gears 27 and 28. Link 22 is preferably turned adjacent the inner extremity to provide an operating finger 37 by means of which the link 22 is oscillated in bearing block 26. By reference to Fig. 5, finger 37 extends through an arcuate slot 38 provided in gear 28, thence through an arcuate slot 39 provided in the stationary plate 17, and thence through a relatively smaller opening 40 in gear 34. When wing 20 is in its lowermost position, finger 37 is in the full line position shown in Fig. 5, but as wing 20 is carried upwardly by wind action, as presently described, finger 37 contacts with the end wall 41 of slot 39 causing finger 37 to be rocked to the dotted line position shown in Fig. 5, and simultaneously gear 34 is swung downwardly by means of engagement of finger 37 in opening 40. In the position shown in Fig. 5, wing 20 is in the dotted line position shown in Fig. 2 and the full line position shown in Fig. 3 with the under surface of the wing in the path of the wind. The force of wind against this surface causes wing 20 to be elevated to the full line position shown in Fig. 2, and as the wing approaches this position, connecting link 22 is rocked causing the upper surface of wing 20 to be swung in the path of the wind, and the wing is then forced downwardly by the wind action, aided by gravity, to the full line position shown in Fig. 3, whereupon the operation is repeated. Wing 19 on the opposite side of the device is actuated by the corresponding mechanism which operates in identically the same manner as that described except that the position is reversed. Link 21 has a turned finger portion 42 which extends through slot 43 in gear 27, thence through slot 44 in plate 17, and thence through opening 45 in gear 30. By reference to Fig. 5 it will be noted that downward movement of wing 20 is limited by contact of finger 37 with the upper end wall 46 of slot 39, and slot 44 is likewise provided with end wall portions corresponding to portions 41 and 46 of slot 39. It has been found in operation that the forward gears 27 and 28 coact to insure unisonous vertical oscillation of the wings 19 and 20, whereas the rearwardly positioned gears 30 and 34 coact to maintain rotational oscillation in unison of the links 21 and 22, and correspondingly the wings secured thereto. When the device is mounted upon the radiator cap, for example, of a running automobile, the force of air or wind is such that the oscillation of the wings is quite rapid and the device closely resembles a living bird in flight.

It has been found desirable to construct the wings 19 and 20 of material light in weight, and aluminum has been found very satisfactory for this purpose. However, because of the relatively excessive strain placed upon the wings they are preferably strengthened by the provision of corrugations 47 extending around the border portion.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to obtain by Letters Patent is:

1. A device of the character described comprising a casing, a pair of coacting gear members pivotally mounted within said casing, a pair of links journalled in said gear members, a pair of wings secured to said links, a finger portion on each link, and a second pair of coacting gear members adapted to engage said finger portions to cause oscillation of said links, said second pair of gear members mounted substantially coaxially with said first mentioned gear members.

2. A device of the character described, comprising a casing, a pair of coacting gear members pivotally mounted within said casing, a bearing member mounted upon each of said gear members, a pair of links mounted for rotational oscillation in said bearing members, a pair of wings secured to said links, a finger portion on each link, and a second pair of gear members pivotally mounted within said casing and adapted to engage said finger portions to cause oscillation of said links, said second pair of gear members mounted substantially coaxially with said first mentioned gear members.

3. A device of the character described, comprising a casing, a mounting plate rigidly mounted in said casing and provided with a pair of slots, a pair of coacting gear members pivotally mounted upon said plate and each provided with a slot, a pair of links journalled for rotational oscillation upon said gear members, a pair of wings secured to said links, and a pair of turned finger portions on said links adapted to extend through said slots in said gear members and plate.

4. A device of the character described, comprising a casing, a mounting plate rigidly mounted in said casing and provided with a pair of slots, a pair of coacting gear members pivotally mounted upon said plate and each provided with a slot, a pair of links journalled for rotational oscillation upon said gear members, a pair of wings secured to said links, a second pair of coacting gear members pivotally mounted upon the opposite side of said plate, and each provided with a slot, and finger portions on said links adapted to extend through said respective bearing members and plate slots.

5. A device of the character described, comprising a casing, a mounting plate rigidly mounted in said casing and provided with a pair of slots, a pair of coacting gear members pivotally mounted upon said plate and each provided with a slot, a pair of links journalled for rotational oscillation upon said gear members, a pair of wings secured to said links, a second pair of coacting gear members pivotally mounted upon the opposite side of said plate, and each provided with a slot, and finger portions on said links adapted to extend through said respective bearing members and plate slots, said second pair of gear members mounted substantially coaxially with said first mentioned gear members.

In testimony whereof I have signed my name to this specification.

CHARLES L. HAWES.